No. 768,804. PATENTED AUG. 30, 1904.
R. H. HUTCHINSON.
MOWING MACHINE.
APPLICATION FILED OCT. 16, 1903.
NO MODEL.

Witnesses
Charles Morgan.
F. C. Jones.

Inventor
R. H. HUTCHINSON.
by
Attorneys

No. 768,804. Patented August 30, 1904.

UNITED STATES PATENT OFFICE.

RUTHERFORD H. HUTCHINSON, OF LAYTON, UTAH.

MOWING-MACHINE.

SPECIFICATION forming part of Letters Patent No. 768,804, dated August 30, 1904.

Application filed October 16, 1903. Serial No. 177,296. (No model.)

*To all whom it may concern:*

Be it known that I, RUTHERFORD H. HUTCHINSON, a citizen of the United States, residing at Layton, in the county of Davis, State of Utah, have invented certain new and useful Improvements in Mowing-Machines; and I do hereby declare the following to be a full, clear, and exact description of the invention, such as will enable others skilled in the art to which it appertains to make and use the same.

This invention relates to mowing-machines; and it has for its object to provide a machine wherein two sets of knives will be slidably mounted upon a cutter-bar for coöperation in the place of the usual arrangement of a single knife and fingers and in which the knives will be reciprocated through the medium of a mechanism that is simple in construction while being positive and efficient in its operation.

Figure 1:
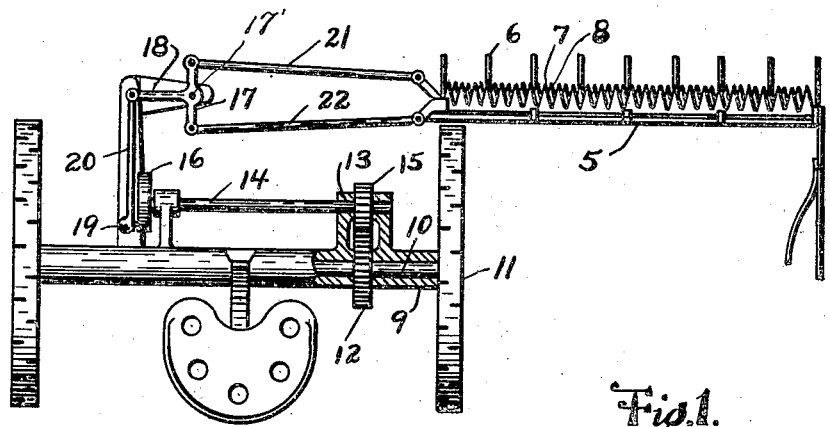
Figure 2:
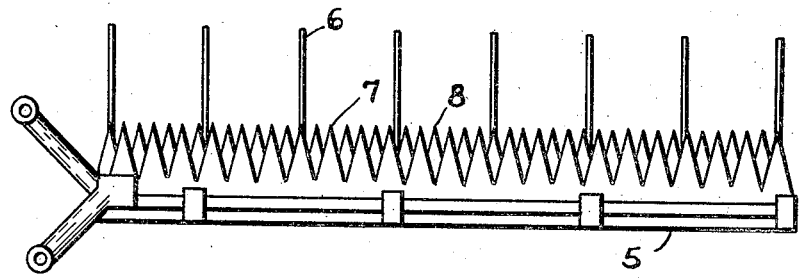

In the drawings forming a portion of this specification, in which like numerals of reference indicate similar parts in both views, Figure 1 is a top plan view of a mower embodying the present invention. Fig. 2 is a top plan view of the cutter-bar employed with the two sets of knives.

Referring now to the drawings, there is shown a mower embodying a cutter-bar 5, from which project forwardly the rods 6, which serve to divide the mass of material to be cut into sections and hold it against lateral movement during the operation of the knives. Upon the bar 5 are mounted slidably the two sets of knives 7 and 8, these sets of knives being held by suitable guides in such manner that they may be independently reciprocated.

The frame of the mower includes the sleeve 9, in which is mounted the axle 10, having a pair of ground-wheels 11 fixed at each end thereof and having also a gear-wheel 12. The sleeve 9 is provided with ears 13, in which is journaled a counter-shaft 14, carrying a pinion 15, that meshes with the gear 12, and at one end of the counter-shaft is a crank-disk 16. A rocker 17 is pivoted to the frame by means of a pin 17' and includes an arm 18, which is connected with the crank-pin 19 on the disk 16 by means of the pitman 20, so that as the machine progresses the rocker is oscillated. Rods 21 and 22 are connected to the ends of the rocker 17 and to the series of knives 7 and 8, respectively, and thus oscillation of the rocker causes reciprocation of the sets of knives oppositely.

With the present arrangement the material to be cut is positively engaged and there is a shear cut at both sides thereof.

What is claimed is—

A mower comprising a frame having a plurality of ears projecting therefrom, a shaft mounted in the frame, ground-wheels connected with its ends, a second shaft revolubly mounted in the ears, gears connecting the two shafts, a crank-disk carried by the second shaft and having a pin, a rock-lever mounted upon the frame and having arms projecting oppositely therefrom, a pair of knife-bars disposed one upon the other, pitmen connecting the knife-bars with the arms of the rock-lever, and a pitman connecting the free end of the lever with the pin of the crank-disk to move the lever upon the pivot when the said disk is revolved.

In testimony whereof I affix my signature in presence of two witnesses.

RUTHERFORD H. HUTCHINSON.

Witnesses:
 ANNIE H. PHILLIPS,
 JED. MCFERSON.